(12) United States Patent
Policicchio et al.

(10) Patent No.: US 6,766,552 B1
(45) Date of Patent: *Jul. 27, 2004

(54) CLEANING IMPLEMENT COMPRISING A REMOVABLE CLEANING PAD HAVING MULTIPLE CLEANING SURFACES

(75) Inventors: Nicola John Policicchio, Mason, OH (US); Steven Allen Holt, Cincinnati, OH (US); Saeed Fereshtehkhou, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,691

(22) Filed: Jan. 13, 2000

Related U.S. Application Data

(62) Division of application No. 09/037,379, filed on Mar. 10, 1998, now Pat. No. 6,101,661.
(60) Provisional application No. 60/041,274, filed on Mar. 20, 1997.

(51) Int. Cl.[7] .............................................. A47L 13/20
(52) U.S. Cl. .................... 15/228; 15/209.1; 15/244.1; 15/244.2; 15/244.3; 15/244.4
(58) Field of Search ................................ 15/208, 209.1, 15/228, 244.1–244.4

(56) References Cited

U.S. PATENT DOCUMENTS

| | | | |
|---|---|---|---|
| 2,842,791 A | 7/1958 | Statler | 15/209.1 |
| 3,038,188 A | 6/1962 | Rebernak | 15/244.1 |
| 3,040,353 A | 6/1962 | Gray | 15/244.3 |
| 3,199,136 A | 8/1965 | George | 15/231 |
| 3,732,652 A | 5/1973 | Furgal et al. | 451/533 |
| 3,761,991 A | 10/1973 | Moss | 15/229.11 |
| 3,778,860 A | 12/1973 | Thielen | 15/147.2 |
| 3,991,431 A | 11/1976 | Thielen | 15/147.2 |
| 4,050,111 A | 9/1977 | Mallory | 15/244.3 |
| 4,300,920 A | 11/1981 | Grove | 95/227 |
| 4,349,933 A | 9/1982 | Thompson | 15/228 |
| 4,603,069 A | 7/1986 | Haq et al. | 428/76 |
| 4,614,679 A | 9/1986 | Farrington, Jr. et al. | 428/138 |
| 4,733,774 A | 3/1988 | Ping, III et al. | 206/0.5 |
| 4,745,021 A | 5/1988 | Ping, III et al. | 428/195 |
| 4,769,267 A | 9/1988 | Hoyt | 428/71 |
| 4,784,892 A | 11/1988 | Storey et al. | 428/172 |
| 4,797,310 A | 1/1989 | Barby et al. | 428/71 |
| 4,852,210 A | 8/1989 | Krajicek | 15/228 |
| 4,902,544 A | 2/1990 | Kim et al. | 428/36.1 |
| 4,961,242 A | 10/1990 | Kresse et al. | 15/228 |
| 4,995,133 A | 2/1991 | Newell | 15/229.1 |
| 5,071,489 A | 12/1991 | Silvenis et al. | 134/42 |
| 5,080,517 A | 1/1992 | Lynn | 401/13 |
| 5,090,832 A | 2/1992 | Rivera et al. | 401/132 |
| 5,093,190 A | 3/1992 | Kwok et al. | 428/288 |
| 5,094,559 A | 3/1992 | Rivera et al. | 401/132 |
| 5,104,728 A | 4/1992 | Obermeyer et al. | 428/286 |
| 5,115,535 A | 5/1992 | Casademunt Ferre et al. | 15/229.7 |
| 5,177,831 A | 1/1993 | Wirth | 15/244.3 |
| 5,187,830 A | 2/1993 | Giallourakis | 15/244.3 |
| 5,195,999 A | 3/1993 | Harada et al. | 604/368 |
| 5,300,345 A | 4/1994 | Aihara et al. | 428/137 |
| 5,419,015 A | 5/1995 | Garcia | 15/228 |
| 5,507,065 A | 4/1996 | McBride et al. | 15/228 |
| 5,533,226 A | 7/1996 | Brown, Jr. | 15/244.1 |
| 5,609,255 A | 3/1997 | Nichols | 206/576 |

FOREIGN PATENT DOCUMENTS

| | | |
|---|---|---|
| DE | 4300920 | 7/1994 |
| EP | 0 357 496 | 3/1990 |
| EP | 0 696 432 | 2/1996 |
| JP | 01178223 | 7/1989 |
| WO | 94/15520 | 7/1994 |
| WO | WO 96/41564 | 12/1996 |

*Primary Examiner*—Mark Spisich
(74) *Attorney, Agent, or Firm*—Thibault Fayette; Jason J. Camp; Kim W. Zerby

(57) ABSTRACT

Disclosed is a cleaning implement comprising a handle and a removable cleaning pad. The cleaning pad is designed to provide multiple cleaning surfaces each of which contact the soiled surface during the cleaning operation. The cleaning pad also preferably has the ability to absorb at least about 10 g of water per g of pad.

20 Claims, 6 Drawing Sheets

CLEANING IMPLEMENT COMPRISING A REMOVABLE CLEANING PAD HAVING MULTIPLE CLEANING SURFACES

CROSS REFERENCE TO RELATED APPLICATION

This application is a divisional of U.S. application Ser. No. 09/037,379, filed Mar. 10, 1998, U.S. Pat. No. 6,101,661 which claims priority to U.S. Provisional Application Serial No. 60/041,274, filed Mar. 20, 1997, the disclosure of both applications being incorporated by reference herein.

TECHNICAL FIELD

This application relates to a cleaning implement useful in removing soils from hard surfaces. The application particularly relates to a cleaning implement comprising a handle and a removable absorbent cleaning pad. The cleaning pad is designed so as to provide multiple cleaning surfaces.

BACKGROUND OF THE INVENTION

The literature is replete with products capable of cleaning hard surfaces such as ceramic tile floors, hardwood floors, counter tops and the like. In the context of cleaning floors, numerous devices are described comprising a handle and some means for absorbing a fluid cleaning composition. Such devices include those that are reusable, including mops containing cotton strings, cellulose and/or synthetic strips, sponges, and the like. While these mops are successful in removing many soils from hard surfaces, they typically require the inconvenience of performing one or more rinsing steps during use to avoid saturation of the material with dirt, soil, and other residues. These mops therefore require the use of a separate container to perform the rinsing step(s) and typically these rinsing steps fail to sufficiently remove dirt residues. This may result in redeposition of significant amounts of soil during subsequent passes of the mop. Furthermore, as reusable mops are used over time, they become increasingly soiled and malodorous. This negatively impacts subsequent cleaning performance.

To alleviate some of the negative attributes associated with reusable mops, attempts have been made to provide mops having disposable cleaning pads. For example, U.S. Pat. No. 5,094,559, issued Mar. 10, 1992 to Rivera et al., describes a mop that includes a disposable cleaning pad comprising a scrubber layer for removing soil from a soiled surface, a blotter layer to absorb fluid after the cleaning process, and a liquid impervious layer positioned between the scrubber and blotter layer. The pad further contains a rupturable packet means positioned between the scrubber layer and the liquid impervious layer. The rupturable packets are so located such that upon rupture, fluid is directed onto the surface to be cleaned. During the cleaning action with the scrubber layer, the impervious sheet prevents fluid from moving to the absorbent blotter layer. After the cleaning action is completed, the pad is removed from the mop handle and reattached such that the blotter layer contacts the floor. While this device may alleviate the need to use multiple rinsing steps, it does require that the user physically handle the pad and reattach a soiled, damp pad in order to complete the cleaning process.

Similarly, U.S. Pat. No. 5,419,015, issued May 30, 1995 to Garcia, describes a mop having removable, washable work pads. The pad is described as comprising an upper layer which is capable of attaching to hooks on a mop head, a central layer of synthetic plastic microporous foam, and a lower layer for contacting a surface during the cleaning operation. The lower layer's composition is stated to depend on the end-use of the device, i.e., washing, polishing or scrubbing. While the reference addresses the problems associated with mops that require rinsing during use, the patent fails to provide a cleaning implement that sufficiently removes the soil deposited on typical household hard surfaces, in particular floors, such that the surface is perceived as essentially free of soil. In particular, the synthetic foam described by Garcia for absorbing the cleaning solution has a relatively low absorbent capacity for water and water-based solutions. As such, the user must either use small amounts of cleaning solution to remain within the absorbent capacity of the pad, or the user must leave a significant amount of cleaning solution on the surface being cleaned. In either situation, the overall performance of the cleaning pad is not optimal.

While many known devices for cleaning hard surfaces are successful at removing a vast majority of the soil encountered by the typical consumer during the cleaning process, they are inconvenient in that they require one or more cleaning steps. The prior art devices that have addressed the issue of convenience typically do so at the cost of cleaning performance. As such, there remains a need for a device that offers both convenience and beneficial soil removal.

Therefore, it is an object of the present invention to provide a cleaning implement that comprises a removable cleaning pad, which alleviates the need to rinse the pad during use. In particular, it is an object of the present invention to provide an implement that comprises a removable cleaning pad with sufficient absorbent capacity, on a gram of absorbed fluid per gram of cleaning pad basis, that allows the cleaning of a large area, such as that of the typical hard surface floor (e.g., 80–100 ft$^2$), without the need to change the pad. It is a further object to provide such a cleaning implement where the pad offers beneficial soil removal properties. In this respect, it is an object to provide a cleaning pad having multiple widths in the pads z-dimension (i.e., thickness). These multiple widths provide the cleaning pad with a plurality of surfaces or edges that contact the soiled surface during the cleaning operation.

SUMMARY OF THE INVENTION

In one aspect, the present invention relates to an implement for cleaning a surface, the implement comprising:
a. a handle; and
b. a removable cleaning pad having an upper surface and a lower surface, wherein the cleaning pad has multiple widths in the z-dimension, and wherein the pad has a $t_{1200}$ absorbent capacity of at least about 5 g/g.

In another aspect, the present invention relates to an implement comprising:
a. a handle; and
b. a removable cleaning pad having an upper surface and a lower surface, wherein the cleaning pad has multiple widths in the z-dimension, and wherein the cleaning pad comprises:
  i. a scrubbing layer; and
  ii. an absorbent layer.

In preferred embodiments, the cleaning implement will comprising:
a. a handle; and
b. a removable cleaning pad having a length and a width, the pad comprising i. a scrubbing layer; and
ii. an absorbent layer comprising a first layer and a second layer, wherein the first layer is located between the scrubbing layer and the second layer and has a smaller width than the second layer.

Depending on the means used for attaching the cleaning pad to the cleaning implement's handle, it may be preferable for the cleaning pad to further comprise a distinct attachment layer. In these embodiments, the absorbent layer would be positioned between the scrubbing layer and the attachment layer.

The implement of the present invention is designed to be compatible with all hard surface substrates, including wood, vinyl, linoleum, no wax floors, ceramic, Formica®, porcelain, glass, wall board, and the like.

BRIEF DESCRIPTION OF THE DRAWING

FIG. 5b is a cross sectional view of the cleaning pad shown in FIG. 5a.

DETAILED DESCRIPTION OF THE INVENTION

I. Definitions

Figure 1A:
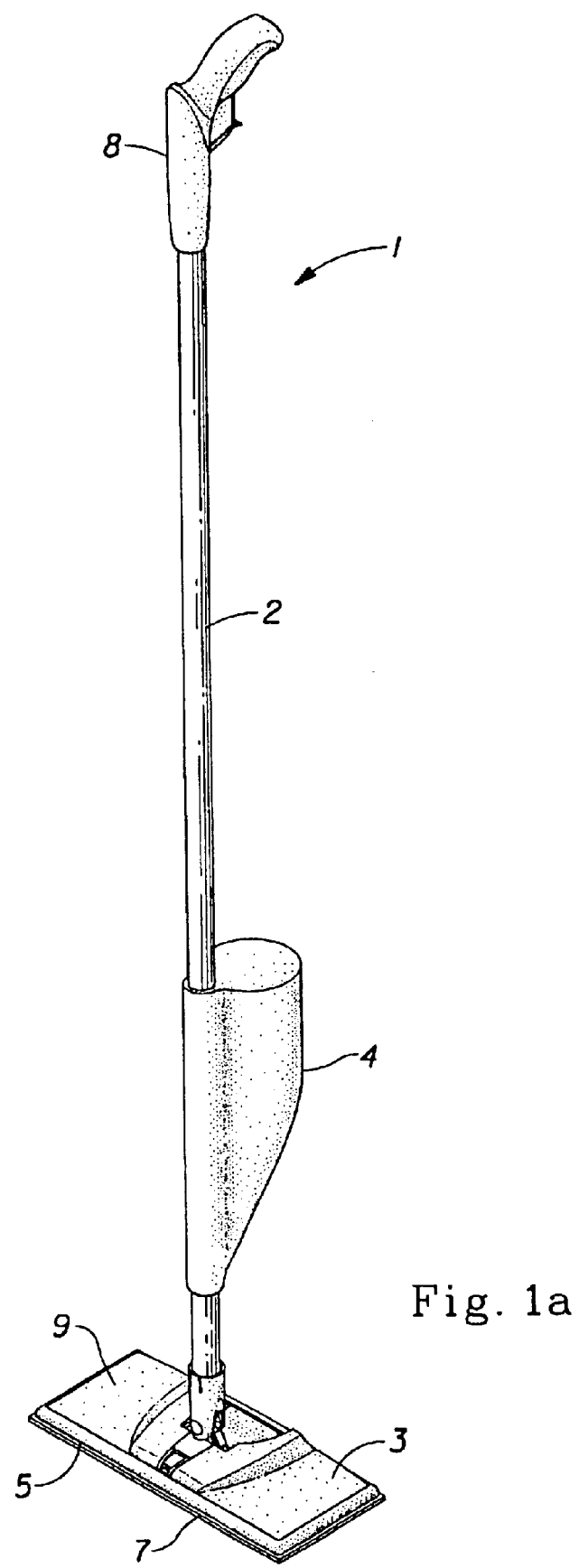
FIG. 1a is a perspective view of a cleaning implement of the present invention which has an on-board fluid dispensing device.

As used herein, the term "comprising" means that the various components, ingredients, or steps, can be conjointly employed in practicing the present invention. Accordingly, the term "comprising" encompasses the more restrictive terms "consisting essentially of" and "consisting of."

As used herein, the term "direct fluid communication" means that fluid can transfer readily between two cleaning pad components or layers (e.g., the scrubbing layer and the absorbent layer) without substantial accumulation, transport, or restriction by an interposed layer. For example, tissues, nonwoven webs, construction adhesives, and the like may be present between the two distinct components while maintaining "direct fluid communication", as long as they do not substantially impede or restrict fluid as it passes from one component or layer to another.

As used herein, the term "z-dimension" refers to the dimension orthogonal to the length and width of the cleaning pad of the present invention, or a component thereof. The z-dimension therefore corresponds to the thickness of the cleaning pad or a pad component.

As used herein, the term "x-y dimension" refers to the plane orthogonal to the thickness of the cleaning pad, or a component thereof. The x and y dimensions correspond to the length and width, respectively, of the cleaning pad or a pad component. In general, when the cleaning pad is used in conjunction with a handle, the implement will be moved in a direction parallel to the y-dimension (or width) of the pad. (See FIG. 2, and the discussion below.) Of course, the present invention is not limited to cleaning pads having four sides. Other shapes, such as circular, elliptical, and the like, may also be used. When determining the width of the pad at any point in the z-dimension, it is understood that the pad is assessed according to its intended use.

As used herein, the term "layer" refers to a member or component of a cleaning pad whose primary dimension is x-y, i.e., along its length and width. It should be understood that the term layer is not necessarily limited to single layers or sheets of material. Thus the layer can comprise laminates or combinations of several sheets or webs of the requisite type of materials. Accordingly, the term "layer" includes the terms "layers" and "layered."

As used herein, the term "hydrophilic" is used to refer to surfaces that are wettable by aqueous fluids deposited thereon. Hydrophilicity and wettability are typically defined in terms of contact angle and the surface tension of the fluids and solid surfaces involved. This is discussed in detail in the American Chemical Society publication entitled *Contact Angle, Wettability and Adhesion*, edited by Robert F. Gould (Copyright 1964), which is hereby incorporated herein by reference. A surface is said to be wetted by a fluid (i.e., hydrophilic) when either the contact angle between the fluid and the surface is less than 90°, or when the fluid tends to spread spontaneously across the surface, both conditions normally co-existing. Conversely, a surface is considered to be "hydrophobic" if the contact angle is greater than 90° and the fluid does not spread spontaneously across the surface.

As used herein, the term "scrim" means any durable material that provides texture to the surface-contacting side of the cleaning pad's scrubbing layer, and also has a sufficient degree of openness to allow the requisite movement of fluid to the absorbent layer of the cleaning pad. Suitable materials include materials that have a continuous, open structure, such as synthetic and wire mesh screens. The open areas of these materials may be readily controlled by varying the number of interconnected strands that comprise the mesh, by controlling the thickness of those interconnected strands, etc. Other suitable materials include those where texture is provided by a discontinuous pattern printed on a substrate. In this aspect, a durable material (e.g., a synthetic) may be printed on a substrate in a continuous or discontinuous pattern, such as individual dots and/or lines, to provide the requisite texture. Similarly, the continuous or discontinuous pattern may printed onto a release material that will then act as the scrim. These patterns may be repeating or they may be random. It will be understood that one or more of the approaches described for providing the desired texture may be combined to form the optional scrim material. The z direction height and open area of the scrim and or scrubbing substrate layer help to control and or retard the flow of liquid into the absorbent core material. The z height of the scrim and or scrubbing substrate help provide a means of controlling the volume of liquid in contact with the cleaning surface while at the same time controlling the rate of liquid absorption, fluid communication into the absorption core material.

For purposes of the present invention, an "upper" layer of a cleaning pad is a layer that is relatively further away from the surface that is to be cleaned (i.e., in the implement context, relatively closer to the implement handle during use). The term "lower" layer conversely means a layer of a cleaning pad that is relatively closer to the surface that is to be cleaned (i.e., in the implement context, relatively further away from the implement handle during use). As such, the scrubbing layer is the lower-most layer and the absorbent layer is an upper layer relative to the scrubber layer. The terms "upper" and "lower" are similarly used when referring to layers that are multi-ply (e.g., when the scrubbing layer is a two-ply material). The terms "above" and "below" are used to describe relative locations of two or more materials in a cleaning pad's thickness. By way of illustration, a material A is "above" material B if material B is positioned closer to the scrubbing layer than material A. Similarly, material B is "below" material A in this illustration.

All percentages, ratios and proportions used herein are by weight unless otherwise specified.

II. Cleaning Implements

The present invention relates to an implement for cleaning a surface, the implement comprising:
a. a handle; and
b. a removable cleaning pad having an upper surface and a lower surface, wherein the cleaning pad has multiple widths in the z-dimension, and wherein the pad has a $t_{1200}$ absorbent capacity of at least about 5 g/g.

The invention further relates to a cleaning implement comprising:
a. a handle; and
b. a removable cleaning pad having an upper surface and a lower surface, wherein the cleaning pad has comprises:
  i. a scrubbing layer; and
  ii. an absorbent layer.

During the effort to develop the present cleaning implement, Applicants discovered that, surprisingly, an important aspect of cleaning performance is related to the ability to provide a cleaning pad having multiple cleaning surfaces or edges, each of which contact the soiled surface during the cleaning operation. In the context of a cleaning implement such as a mop, these surfaces or edges are provided such that during the typical cleaning operation (i.e., where the implement is moved back and forth in a direction substantially parallel to the pad's y-dimension or width), each of the surfaces or edges contact the surface being cleaned as a result of "rocking" of the cleaning pad. The effect of multiple edges is achieved by constructing the pad such that it has multiple widths through its z-dimension. That is, these multiple widths form a plurality of surfaces or edges along the front and back of the pad. This aspect of the invention, and the benefits provided, are discussed in detail with reference to the drawings.

The skilled artisan will recognize that various materials may be utilized to carry out the claimed invention. Thus, while preferred materials are described below for the various implement and cleaning pad components, it is recognized that the scope of the invention is not limited to such descriptions.

A. Handle

The handle of the cleaning implement will be any material that will facilitate gripping of the cleaning implement. The handle of the cleaning implement will preferably comprise any elongated, durable material that will provide practical cleaning. The length of the handle will be dictated by the end-use of die implement.

The handle will preferably comprise at one end a support head to which the cleaning pad can be releasably attached.

To facilitate case of use, the support head can be pivotably attached to the handle using known joint assemblies. Any suitable means for attaching the cleaning pad to the support head may be utilized, so long as the cleaning pad remains affixed during the cleaning process. Examples of suitable fastening means include clamps, hooks & loops (e.g., Velcro®), and the like. In a preferred embodiment, the support head will comprise hooks on its lower surface that will mechanically attach to the upper layer (preferably a distinct attachment layer) of the absorbent cleaning pad.

A preferred handle, comprising a fluid dispensing means, is depicted in FIG. 1a. Referring to FIG. 1a, cleaning implement 1 comprises a hand grip 8, an elongated shaft 2, a fluid reservoir 4 and a support head 3. Support head 3 has an upper surface 9 and a lower surface 5, where lower surface 5 is designed to releasably attach a cleaning pad, depicted as 7. A preferred handle comprising a dispensing means is described in detail in co-pending U.S. patent application Ser. No. 08/756,774, filed Nov. 15, 1996 by V. S. Ping, et al., U.S. Pat. No. 5,888,006 which is incorporated by reference herein.

Figure 1B:
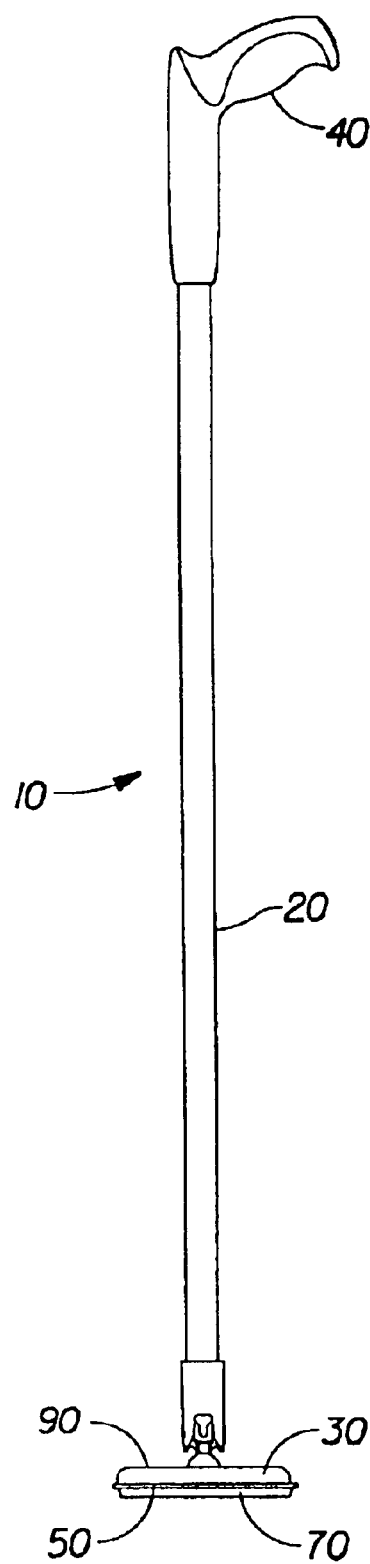
FIG. 1b is a perspective view of a cleaning implement of the present invention which does not have an on-board fluid dispensing device.

Another preferred handle, which does not contain a fluid dispensing means, is depicted in FIG. 1b. Referring to FIG. 1b, cleaning implement 10 comprises a hand grip 40, an elongated shaft 20 and a support head 30. Support head 30 has an upper surface 90 and a lower surface 50, where lower surface 50 is designed to releasably attach a cleaning pad, depicted as 70. A preferred handle not comprising a fluid dispensing means is described in detail in co-pending U.S. patent application Ser. No. 08/716,755, filed Sept. 23, 1996 by A. J. Irwin abandoned, which is incorporated by reference herein.

B. Removable Cleaning Pad

The present invention is based on the convenience of a removable, disposable cleaning pad that also provides significant cleaning benefits. The cleaning performance benefits are related to the structural characteristics described below, combined with the ability of the pad to remove and retain solubilities soils.

The cleaning pads will preferably have an absorbent capacity when measured under a confining pressure of 0.09 psi after 20 minutes (1200 seconds) (hereafter referred to as "$t_{1200}$ absorbent capacity") of at least about 5 g deionized water per g of the cleaning pad. The absorbent capacity of the pad is measured at 20 minutes (1200 seconds) after exposure to deionized water, as this represents a typical time for the consumer to clean a hard surface such as a floor. The confining pressure represents typical pressures exerted on the pad during the cleaning process. As such, the cleaning pad should be capable of absorbing significant amounts of the cleaning solution within this 1200 second period under 0.09 psi. The cleaning pad will more preferably have a $t_{1200}$ absorbent capacity of at least about 10 g/g, still more preferably at least about 15 g/g, still more preferably at least about 20 g/g, and most preferably at least about 30 g/g. The cleaning pad will preferably have a $t_{900}$ absorbent capacity of at least about 5 g/g, more preferably a $t_{900}$ absorbent capacity of at least about 15 g/g.

Values for $t_{1200}$ and $t_{900}$ absorbent capacity are measured by the performance under pressure (referred to herein as "PUP") method, which is described in detail in the Test Methods section below.

The cleaning pads will also preferably, but not necessarily, have a total fluid capacity (of deionized water) of at least about 100 g, more preferably at least about 200 g, still more preferably at least about 300 g and most preferably at least about 400 g. While pads having a total fluid capacity less than 100 g are within the scope of the invention, they are not as well suited for cleaning large areas, such as seen in a typical household, as are higher capacity pads.

Each of the components of the absorbent pad are described in detail. However, the skilled artisan will recognize that various materials known to serve similar purposes may substituted with similar results.

i. Scrubbing Layer

The scrubbing layer is the portion of the cleaning pad that contacts the soiled surface during cleaning. As such, materials useful as the scrubbing layer must be sufficiently durable that the layer will retain its integrity during the cleaning process. In addition, when the cleaning pad is used in combination with a solution, the scrubbing layer must be capable of transitioning liquids and soils to the absorbent layer. Whether the implement is used with a cleaning solution (i.e., in the wet state) or without cleaning solution (i.e., in the dry state), the scrubbing layer will, in addition to removing particulate matter, facilitate other functions, such as polishing, dusting, and buffing the surface being cleaned.

The scrubbing layer can be a monolayer, or a multi-layer structure one or more of whose layers may be slitted to facilitate the scrubbing of the soiled surface and the uptake of particulate matter. This scrubbing layer, as it passes over the soiled surface, interacts with the soil (and cleaning solution when used), loosening and emulsifying tough soils and permitting them to pass freely into the absorbent layer of the pad. The scrubbing layer preferably contains openings (e.g., slits) that provide an easy avenue for larger particulate matter to move freely in and become entrapped within the absorbent layer of the pad. Low density structures are preferred for use as the scrubbing layer, to further facilitate transport of particulate matter to the pad's absorbent layer.

In order to provide desired integrity, materials particularly suitable for the scrubbing layer include synthetics such as polyolefins (e.g., polyethylene and polypropylene), polyesters, polyamides, synthetic cellulosics (e.g., Rayon®), and blends thereof. Such synthetic materials may be manufactured using known process such as carded, spunbond, meltblown, airlaid, needle punched and the like.

The scrubbing layer may also comprise, at least on a portion of the pad's lower surface, a material that provides significant texture to the pad. For example, a preferred means for providing such texture is to form a multilayer composite comprising a scrim material (e.g., polypropylene) and a spunlaced material (e.g., polyester). The composite is heat pressed to partially melt the scrim material, which results in bonding of the discrete layers. Exposure to heat also causes the scrim material to shrink, thereby providing a multilayer composite having wrinkles or puckers.

As discussed in detail below, the cleaning pad may comprise a distinct layer that serves as an attachment layer to the cleaning implement. However, in certain embodiments, the cleaning pad may be designed such that the scrubbing layer also functions to attach the pad to the implement For example, the scrubbing layer may be larger than the absorbent layer in length, width or both, such that it can be directly attached to the implement. This may eliminate the need for a separate scrubbing layer.

ii. Absorbent Layer

The absorbent layer serves to retain any fluid and soil absorbed by the cleaning pad during use. While the scrubbing layer has some affect on the pad's ability to absorb fluid, the absorbent layer plays the major role in achieving desired overall absorbency. Furthermore, the absorbent layer preferably comprises multiple layers which are designed to provide the cleaning pad with multiple planar surfaces.

From a fluid absorbency perspective, the absorbent layer will be capable of removing fluid and soil from the scrubbing layer so that the scrubbing layer will have capacity to continually remove soil from the surface. The absorbent layer also should be capable of retaining absorbed material under typical in-use pressures to avoid "squeeze-out" of absorbed soil, cleaning solution, etc.

The absorbent layer will comprise any material(s) capable of absorbing and retaining fluid during use. To achieve desired total fluid capacities, it will be preferred to include in the absorbent layer a material having a relatively high capacity (in terms of grams of fluid per gram of absorbent material). As used herein, the term "superabsorbent material" means any absorbent material having a g/g capacity for water of at least about 15 g/g, when measured under a confining pressure of 0.3 psi. Because a majority of the cleaning fluids useful with the present invention are aqueous based, it is preferred that the superabsorbent materials have a relatively high g/g capacity for water or water-based fluids.

Representative superabsorbent materials include water insoluble, water-swellable superabsorbent gelling polymers (referred to herein as "superabsorbent gelling polymers") which are well known in the literature. These materials demonstrate very high absorbent capacities for water. The superabsorbent gelling polymers useful in the present invention can have a size, shape and/or morphology varying over a wide range. These polymers can be in the form of particles that do not have a large ratio of greatest dimension to smallest dimension (e.g., granules, flakes, pulverulents, interparticle aggregates, interparticle crosslinked aggregates, and the like) or they can be in the form of fibers, sheets, films, foams, laminates, and the like. The use of superabsorbent gelling polymers in fibrous form provides the benefit of enhanced retention; relative to particles, during the cleaning process. While their capacity is generally lower for aqueous-based mixtures than it is for water, these materials still demonstrate significant absorbent capacity for such mixtures. The patent literature is replete with disclosures of water-swellable materials. See, for example, U.S. Pat. No. 3,699,103 (Harper et al.), issued Jun. 13, 1972; U.S. Pat. No. 3,770,731 (Harmon), issued Jun. 20, 1972; U.S. Reissue Pat. No. 32,649 (Brandt et al.), reissued Apr. 19, 1989; U.S. Pat. No. 4,834,735 (Alemany et al.), issued May 30, 1989.

Superabsorbent gelling polymers useful in the present invention include a variety of water-insoluble, but water-swellable polymers capable of absorbing large quantities of fluids. Such polymeric materials are also commonly referred to as "hydrocolloids", and can include polysaccharides such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof. Typically, superabsorbent gelling polymers useful in the present invention have a multiplicity of anionic functional groups, such as sulfonic acid, and more typically carboxy, groups. Examples of polymers suitable for use herein include those which are prepared from polymerizable, unsaturated, acid-containing monomers. Thus, such monomers include the olefinically unsaturated acids and anhydrides that contain at least one carbon to carbon olefinic double bond. More specifically, these monomers can be selected from olefinically unsaturated carboxylic acids and acid anhydrides, olefinically unsaturated sulfonic acids, and mixtures thereof.

Some non-acid monomers can also be included, usually in minor amounts, in preparing the superabsorbent gelling polymers useful herein. Such non-acid monomers can include, for example, the water-soluble or water-dispersible esters of the acid-containing monomers, as well as monomers that contain no carboxylic or sulfonic acid groups at all. Optional non-acid monomers can thus include monomers containing the following types of functional groups: carboxylic acid or sulfonic acid esters, hydroxyl groups, amide-groups, amino groups, nitrile groups, quaternary ammonium salt groups, aryl groups (e.g., phenyl groups, such as those derived from styrene monomer). These non-acid monomers are well-known materials and are described in greater detail, for example, in U.S. Pat. No. 4,076,663 (Masuda et al), issued Feb. 28, 1978, and in U.S. Pat. No. 4,062,817 (Westerman), issued Dec. 13, 1977, both of which are incorporated by reference.

Olefinically unsaturated carboxylic acid and carboxylic acid anhydride monomers include the acrylic acids typified by acrylic acid itself, methacrylic acid, ethacrylic acid, α-chloroacrylic acid, a-cyanoacrylic acid, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-sterylacrylic acid, itaconic acid, citroconic acid, mesaconic acid, glutaconic acid, aconitic acid, maleic acid, fumaric acid, tricarboxyethylene and maleic acid anhydride.

Olefinically unsaturated sulfonic acid monomers include aliphatic or aromatic vinyl sulfonic acids such as vinylsulfonic acid, allyl sulfonic acid, vinyl toluene sulfonic acid and styrene sulfonic acid; acrylic and methacrylic sulfonic acid such as sulfoethyl acrylate, sulfoethyl methacrylate, sulfopropyl acrylate, sulfopropyl methacrylate, 2-hydroxy-3-methacryloxypropyl sulfonic acid and 2-acrylamide-2-methylpropane sulfonic acid.

Preferred superabsorbent gelling polymers for use in the present invention contain carboxy groups. These polymers include hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network crosslinked polymers of partially neutralized polyacrylic acid. These polymers can be used either solely or in the form of a mixture of two or more different polymers. Examples of these polymer materials are disclosed in U.S. Pat. No. 3,661,875, U.S. Pat. No. 4,076,663, U.S. Pat. No. 4,093,776, U.S. Pat. No. 4,666,983, and U.S. Pat. No. 4,734,478.

Most preferred polymer materials for use in making the superabsorbent gelling polymers are slightly network crosslinked polymers of partially neutralized polyacrylic acids and starch derivatives thereof. Most preferably, the hydrogel-forming absorbent polymers comprise from about 50 to about 95%, preferably about 75%, neutralized, slightly network crosslinked, polyacrylic acid (i.e. poly (sodium acrylateacrylic acid)). Network crosslinking renders the polymer substantially water-insoluble and, in part, determines the absorptive capacity and extractable polymer content characteristics of the superabsorbent gelling polymers. Processes for network crosslinking these polymers and typical network crosslinking agents are described in greater detail in U.S. Pat. No. 4,076,663.

While the superabsorbent gelling polymers is preferably of one type (i.e., homogeneous), mixtures of polymers can also be used in the implements of the present invention. For example, mixtures of starch-acrylic acid graft copolymers and slightly network crosslinked polymers of partially neutralized polyacrylic acid can be used in the present invention.

While any of the superabsorbent gelling polymers described in the prior art may be useful in the present invention, it has recently been recognized that where significant levels (e.g., more than about 50% by weight of the absorbent structure) of superabsorbent gelling polymers are to be included in an absorbent structure, and in particular where one or more regions of the absorbent layer will comprise more than about 50%, by weight of the region, the problem of gel blocking by the swollen particles may impede fluid flow and thereby adversely affect the ability of the gelling polymers to absorb to their full capacity in the desired period of time. U.S. Pat. No. 5,147,343 (Kellenberger et al.), issued Sep. 15, 1992 and U.S. Pat. No. 5,149,335 (Kellenberger et al.), issued Sep. 22, 1992, describe superabsorbent gelling polymers in terms of their Absorbency Under Load (AUL), where gelling polymers absorb fluid (0.9% saline) under a confining pressure of 0.3 psi. (The disclosure of each of these patents is incorporated herein.) The methods for determining AUL are described in these patents. Polymers described therein may be particularly useful in embodiments of the present invention that contain regions of relatively high levels of superabsorbent gelling polymers. In particular, where high concentrations of superabsorbent gelling polymer are incorporated in the cleaning pad, those polymers will preferably have an AUL, measured according to the methods described in U.S. Pat. No. 5,147,343, of at least about 24 ml/g, more preferably at least about 27 ml/g after 1 hour; or an AUL, measured according to the methods described in U.S. Pat. No. 5,149,335, of at least about 15 ml/g, more preferably at least about 18 ml/g after 15 minutes.

U.S. Pat. No. 5,599,335 (Goldman et al.), issued Feb. 11, 1997, and U.S. Pat. No. 5,562,646 (Goldman et al.), issued Oct. 8, 1996 (both of which are incorporated by reference herein), also address the problem of gel blocking and describe superabsorbent gelling polymers useful in overcoming this phenomena. These applications specifically describe superabsorbent gelling polymers which avoid gel blocking at even higher confining pressures, specifically 0.7 psi. In the embodiments of the present invention where the absorbent layer will contain regions comprising high levels (e.g., more than about 50% by weight of the region) of superabsorbent gelling polymer, it may be preferred that the superabsorbent gelling polymer be as described in the aforementioned patents to Goldman et al.

Other superbsorbent materials useful herein include hydrophilic polymeric foams, such as those described in commonly assigned copending U.S. patent application Ser. No. 08/563,866 (DesMarais et al.), filed Nov. 29, 1995 U.S. Pat No. 5,650,222; U.S. Pat. No. 5,387,207 Dyer et al.), issued Feb. 7, 1995; U.S. Pat. No. 5,563,179 (DesMarais et al.), issued Oct. 8, 1996; U.S. Pat. No. 5,550,167 (DesMarais), issued Aug. 27, 1996; and U.S. Pat. No. 5,260,345 (DesMarais et al.), issued Nov. 9, 1993; each of which is incorporated by reference herein. These references describe polymeric, hydrophilic absorbent foams that are obtained by polymerizing a high internal phase water-in-oil emulsion (commonly referred to as HIPEs). These foams are readily tailored to provide varying physical properties (pore size, capillary suction, density, etc.) that affect fluid handling ability. As such, these materials are particularly useful, either alone or in combination with other such foams or with fibrous structures, in providing the overall capacity required by the present invention.

Where superabsorbent material is included in the absorbent layer, the absorbent layer will preferably comprise at least about 15%, by weight of the absorbent layer, more preferably at least about 20%, still more preferably at least about 25%, of the superabsorbent material.

The absorbent layer may also consist of, or comprise, fibrous material. Fibers useful in the present invention include those that are naturally occurring (modified or unmodified), as well as synthetically made fibers. Examples of suitable unmodified/modified naturally occurring fibers include cotton, Esparto grass, bagasse, kemp, flax, silk, wool, wood pulp, chemically modified wood pulp, jute, ethyl cellulose, and cellulose acetate. Suitable synthetic fibers can be made from polyvinyl chloride, polyvinyl fluoride, polytetrafluoroethylene, polyvinylidene chloride, polyacrylics such as ORLON®, polyvinyl acetate, Rayon®, polyethylvinyl acetate, non-soluble or soluble polyvinyl alcohol, polyolefins such as polyethylene (e.g., PULPEX®) and polypropylene, polyamides such as nylon, polyesters such as DACRON® or KODEL®, polyurethanes, polystyrenes, and the like. The absorbent layer can comprise solely naturally occurring fibers, solely synthetic fibers, or any compatible combination of naturally occurring and synthetic fibers.

The fibers useful herein can be hydrophilic, hydrophobic or can be a combination of both hydrophilic and hydrophobic fibers. As indicated above, the particular selection of hydrophilic or hydrophobic fibers will depend upon the other materials included in the absorbent (and to some degree the scrubbing) layer. That is, the nature of the fibers will be such that the cleaning pad exhibits the necessary fluid delay and overall fluid absorbency. Suitable hydrophilic fibers for use in the present invention include cellulosic fibers, modified cellulosic fibers, rayon, polyester fibers such as hydrophilic nylon (HYDROFIL®). Suitable hydrophilic fibers can also be obtained by hydrophilizing hydrophobic fibers, such as surfactant-treated or silica-treated thermoplastic fibers derived from, for example, polyolefins such as polyethylene or polypropylene, polyacrylics, polyamides, polystyrenes, polyurethanes and the like.

Suitable wood pulp fibers can be obtained from well-known chemical processes such as the Kraft and sulfite processes. It is especially preferred to derive these wood pulp fibers from southern soft woods due to their premium absorbency characteristics. These wood pulp fibers can also be obtained from mechanical processes, such as ground wood, refiner mechanical, thermomechanical, chemimechanical, and chemi-thermomechanical pulp processes. Recycled or secondary wood pulp fibers, as well as bleached and unbleached wood pulp fibers, can be used.

Another type of hydrophilic fiber for use in the present invention is chemically stiffened cellulosic fibers. As used herein, the term "chemically stiffened cellulosic fibers" means cellulosic fibers that have been stiffened by chemical means to increase the stiffness of the fibers under both dry and aqueous conditions. Such means can include the addition of a chemical stiffening agent that, for example, coats and/or impregnates the fibers. Such means can also include the stiffening of the fibers by altering the chemical structure, e.g., by crosslinking polymer chains.

Where fibers are used as the absorbent layer (or a constituent component thereof), the fibers may optionally be combined with a thermoplastic material. Upon melting, at least a portion of this thermoplastic material migrates to the intersections of the fibers, typically due to interfiber capillary gradients. These intersections become bond sites for the thermoplastic material. When cooled, the thermoplastic materials at these intersections solidify to form the bond sites that hold the matrix or web of fibers together in each of the respective layers. This may be beneficial in providing additional overall integrity to the cleaning pad.

Amongst its various effects, bonding at the fiber intersections increases the overall compressive modulus and strength of the resulting thermally bonded member. In the case of the chemically stiffened cellulosic fibers, the melting and migration or the thermoplastic material also has the effect of increasing the average pore size of the resultant web, while maintaining the density and basis weight of the web as originally formed. This can improve the fluid acquisition properties of the thermally bonded web upon initial exposure to fluid, due to improved fluid permeability, and upon subsequent exposure, due to the combined ability of the stiffened fibers to retain their stiffness upon wetting and the ability of the thermoplastic material to remain bonded at the fiber intersections upon wetting and upon wet compression. In net, thermally bonded webs of stiffened fibers retain their original overall volume, but with the volumetric regions previously occupied by the thermoplastic material becoming open to thus increase the average interfiber capillary pore size.

Thermoplastic materials useful in the present invention can be in any of a variety of forms including particulates, fibers, or combinations of particulates and fibers. Thermoplastic fibers are a particularly preferred form because of their ability to form numerous interfiber bond sites. Suitable thermoplastic materials can be made from any thermoplastic polymer that can be melted at temperatures that will not extensively damage the fibers that comprise the primary web or matrix of each layer. Preferably, the melting point of this thermoplastic material will be less than about 190° C., and preferably between about 75° C. and about 175° C. In any event, the melting point of this thermoplastic material should be no lower than the temperature at which the thermally bonded absorbent structures, when used in the cleaning pads, are likely to be stored. The melting point of the thermoplastic material is typically no lower than about 50° C.

The thermoplastic materials, and in particular the thermoplastic fibers, can be made from a variety of thermoplastic polymers, including polyolefins such as polyethylene (e.g., PULPEX®) and polypropylene, polyesters, copolyesters, polyvinyl acetate, polyethylvinyl acetate, polyvinyl chloride, polyvinylidene chloride, polyacrylics, polyamides, copolyamides, polystyrenes, polyurethanes and copolymers of any of the foregoing such as vinyl chloride/vinyl acetate, and the like. Depending upon the desired characteristics for the resulting thermally bonded absorbent member, suitable thermoplastic materials include hydrophobic fibers that have been made hydrophilic, such as surfactant-treated or silica-treated thermoplastic fibers derived from, for example, polyolefins such as polyethylene or polypropylene, polyacrylics, polyamides, polystyrenes, polyurethanes and the like. The surface of the hydrophobic thermoplastic fiber can be rendered hydrophilic by treatment with a surfactant, such as a nonionic or anionic surfactant, e.g., by spraying the fiber with a surfactant, by dipping the fiber into a surfactant or by including the surfactant as part of the polymer melt in producing the thermoplastic fiber. Upon melting and resolidification, the surfactant will tend to remain at the surfaces of the thermoplastic fiber. Suitable surfactants include nonionic surfactants such as Brij® 76 manufactured by ICI Americas, Inc. of Wilmington, Del., and various surfactants sold under the Pegosperse® trademark by Glyco Chemical, Inc. of Greenwich, Conn. Besides nonionic surfactants, anionic surfactants can also be used. These surfactants can be applied to the thermoplastic fibers at levels of, for example, from about 0.2 to about 1 g. per sq. of centimeter of thermoplastic fiber.

Suitable thermoplastic fibers can be made from a single polymer (monocomponent fibers), or can be made from more than one polymer (e.g., bicomponent fibers). As used herein, "bicomponent fibers" refers to thermoplastic fibers that comprise a core fiber made from one polymer that is encased within a thermoplastic sheath made from a different polymer. The polymer comprising the sheath often melts at a different, typically lower, temperature than the polymer comprising the core. As a result, these bicomponent fibers provide thermal bonding due to melting of the sheath polymer, while retaining the desirable strength characteristics of the core polymer.

Suitable bicomponent fibers for use in the present invention can include sheath/core fibers having the following polymer combinations: polyethylene/polypropylene, polyethylvinyl acetate/polypropylene, polyethylene/polyester, polypropylene/polyester, copolyester/polyester, and the like. Particularly suitable bicomponent thermoplastic fibers for use herein are those having a polypropylene or polyester core, and a lower melting copolyester, polyethylvinyl acetate or polyethylene sheath (e.g., those available from Danaklon a/s, Chisso Corp., and CELBOND®, available from Hercules). These bicomponent fibers can be concentric or eccentric. As used herein, the terms "concentric" and "eccentric" refer to whether the sheath has a thickness that is even, or uneven, through the cross-sectional area of the bicomponent fiber. Eccentric bicomponent fibers can be desirable in providing more compressive strength at lower fiber thicknesses.

Methods for preparing thermally bonded fibrous materials are described in co-pending U.S. application Ser. No. 08/479,096 (Richards et al.), filed Jul. 3, 1995 (see especially pages 16–20), U.S. Pat. 5,607,414 and U.S. Pat. No. 5,549,589 (Horney et al.), issued Aug. 27, 1996 (see especially Columns 9 to 10). The disclosure of both of these references are incorporated by reference herein.

The absorbent layer may also comprise a HIPE-derived hydrophilic, polymeric foam that does not have the high absorbency of those described above as "superabsorbent materials". Such foams and methods for their preparation are described in U.S. Pat. No. 5,550,167 (DesMarais), issued Aug. 27, 1996; and commonly assigned copending U.S. patent application Ser. No. 08/370,695 (Stone et al.), filed Jan. 10, 1995 (both of which are incorporated by reference herein) U.S. Pat. No. 5,563,179.

The absorbent layer of the cleaning pad may be comprised of a homogeneous material, such as a blend of cellulosic fibers (optionally thermally bonded) and swellable superabsorbent gelling polymer. Alternatively, the absorbent layer may be comprised of discrete layers of material, such as a layer of thermally bonded airlaid material and a discrete layer of a superabsorbent material. For example, a thermally bonded layer of cellulosic fibers can be located lower than (i.e., beneath) the superabsorbent material (i.e., between the superabsorbent material and the scrubbing layer). In order to achieve high absorptive capacity and retention of fluids under pressure, while at the same time providing initial delay in fluid uptake, it may be preferable to utilize such discrete layers when forming the absorbent layer. In this regard, the superabsorbent material can be located remote from the scrubbing layer by including a less absorbent layer as the lower-most aspect of the absorbent layer. For example, a layer of cellulosic fibers can be located lower (i.e., beneath) than the superabsorbent material (i.e., between the superabsorbent material and the scrubbing layer).

In a preferred embodiment, the absorbent layer will comprise a thermally bonded airlaid web of cellulose fibers (Flint River, available from Weyerhaeuser, Wash.) and AL Thermal C (thermoplastic available from Danaklon a/s, Varde, Denmark), and a swellable hydrogel-forming superabsorbent polymer. The superabsorbent polymer is preferably incorporated such that a discrete layer is located near the surface of the absorbent layer which is remote from the scrubbing layer. Preferably, a thin layer of, e.g., cellulose fibers (optionally thermally bonded) are positioned above the superabsorbent gelling polymer to enhance containment.

iii. Optional Attachment Layer

The cleaning pads of the present invention will optionally have an attachment layer that allows the pad to be connected to the implements handle or the support head in preferred implements. The attachment layer may be necessary in those embodiments where the absorbent layer is not suitable for attaching the pad to the support head of the handle. The attachment layer may also function as a means to prevent fluid flow through the top surface (i.e., the handle-contacting surface) of the cleaning pad, and may further provide enhanced integrity of the pad. As with the scrubbing and absorbent layers, the attachment layer may consist of a mono-layer or a multi-layer structure, so long as it meets the above requirements.

In a preferred embodiment of the present invention, the attachment layer will comprise a surface which is capable of being mechanically attached to the handle's support head by use of known hook and loop technology. In such an embodiment, the attachment layer will comprise at least one surface which is mechanically attachable to hooks that are permanently affixed to the bottom surface of the handle's support head.

To achieve the desired fluid imperviousness and attachability, it is preferred that a laminated structure comprising, e.g., a meltblown film and fibrous, nonwoven structure be utilized. In a preferred embodiment, the attachment layer is a tri-layered material having a layer of meltblown polypropylene film located between two layers of spun-bonded polypropylene.

iv. Multiple Widths in the Z-Dimension

While the ability of the cleaning pad to absorb and retain fluids has been determined to be important to hard surface cleaning performance (see, e.g., copending U.S. patent application Ser. No. 08/756,507, (Holt et al.), U.S. Pat. No. 5,960,508, copending U.S. patent application Ser. No. 08/756,864 (Sherry et al.), U.S. Pat. No. 6,003,191, and copending U.S. patent application Ser. No. 08/756,999 (Holt et al.), U.S. Pat. No. 6,048,123, all filed Nov. 26, 1996 and incorporated by reference herein), Applicants have further discovered the importance of overall structure of the cleaning pad. In particular, Applicants have discovered that with pads having an essentially flat floor contacting surface (i.e., essentially one planar surface for contacting the soiled surface during cleaning), cleaning performance is not maximized because removed soil tends to accumulate around the periphery of the pad, particularly at the pad's front and rear edges. Thus, there is significant pad surface area that does not come in intimate contact with the floor during cleaning.

Figure 2:
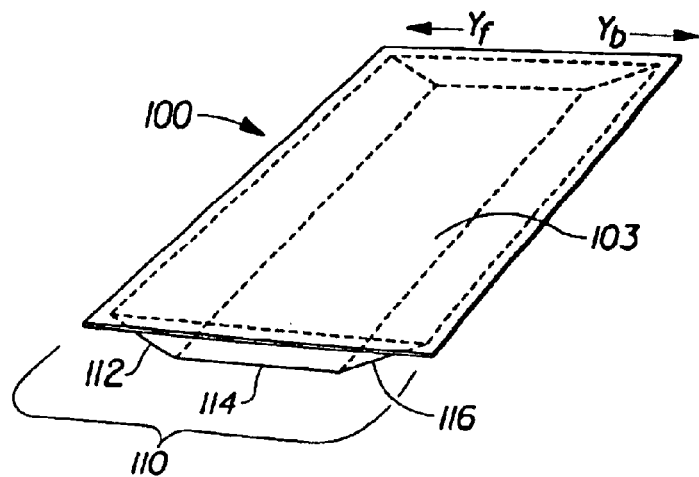
FIG. 2 is a perspective view of a cleaning pad of the present invention.

The present pads, which provide multiple surfaces or edges during cleaning address this issue, and provide enhanced performance. Referring to FIG. 2 in the drawings, cleaning pad 100 is depicted as having an upper surface 103 that allows the pad to be releasably attached to a handle. Cleaning pad 100 also has a lower surface depicted generally as 110 which contacts the floor or other hard surface during cleaning. In this embodiment, lower surface 110 actually consists of 3 substantially planar surfaces 112, 114 and 116. These distinct surfaces are created by decreasing the width of cleaning pad 100 in the pad's z-dimension. As depicted, the planes corresponding to surfaces 112 and 116 intersect the plane corresponding to surface 114. Thus, when an implement to which pad 100 is attached is moved from rest in the direction indicated by $Y_f$, friction causes pad 100 to "rock" such that lower surface 112 contacts the surface being cleaned. As the movement in the $Y_f$ direction diminishes, lower surface 114 will then contact the surface being cleaned. As the implement and pad are moved from rest in the direction indicated by $Y_b$, friction causes pad 100 to rock such that lower surface 116 then contacts the surface being cleaned. As this cleaning motion is repeated, the portion of the pad contacting the soiled surface is constantly changing. Thus, relative to an essentially flat cleaning pad, more surface area of the pad contacts the floor or other hard surface during use.

While the pad depicted in FIG. 2 is shown to have a continuous decrease in width moving from the top to the bottom of the pad, it may be preferred to provide layer widths that change discontinuously. For example, as is depicted in FIG. 5b, the absorbent layer is comprised of three distinct layers, which become smaller in width moving in the direction of the scrubbing layer. (That is, the layers of the absorbent layer become narrower, discontinuously, when moving down in the direction of the scrubbing layer.) The decreasing widths result in three surfaces 411, 413 and 415. Furthermore, the discontinuity of these decreasing widths provide multiple edges in the form of the front and rear aspects of layers 405, 407 and 409. This multiplicity of edges is believed to provide still better particulate pick up. Of course, the effect of multiple discrete edges may be accomplished using more or fewer discrete layers in the absorbent layer. The effect may alternatively be accomplished by, e.g., using a moldable material as the absorbent layer (i.e., only one absorbent layer would be a monolayer), by using an implement whose topography is transferred to the pad, etc.

It will be recognized that while the discussion above relates primarily to cleaning pads having 2 or 3 layers that decrease in width to provide the desired decrease in overall pad width in the z-dimension, it may be preferred to use more than 3 discrete layers, particularly when the individual layers are relatively thin. Of course, as discussed above, in certain embodiments there will be only one discrete layer, such as where a material is molded to provide the desired decreasing width.

It will be also be recognized that while the above discussion relates to the absorbent layer or the implement as providing the requisite decrease in width in the z-dimension, the desired effect may be accomplished by using an absorbent layer of uniform width, but using a scrubbing layer or other material having a narrower width than the absorbent layer.

III. Cleaning Pad

While the cleaning pads of the present development were initially constructed for use in the previously-described cleaning implements, the cleaning pads themselves can be used without attachment to a handle. They may therefore be constructed without the need to be attachable to a handle. It may nonetheless be convenient to construct the cleaning pads such that they can be used either in combination with a handle or as a stand-alone product. As such, it may be preferred to prepare the pads with an optional attachment layer. With the exception of not requiring the ability to be attached to a handle, the pads themselves are as described with respect to the implement.

IV. Other Aspects and Specific Embodiments of the Invention

To enhance the pad's ability to remove tough soil residues and increase the amount of cleaning fluid in contact with the cleaning surface, it may be desirable to incorporate a scrim material into the cleaning pad. The scrim will be comprised of a durable, tough material that will provide texture to the pad's scrubbing layer, particularly when in-use pressures are applied to the pad. Preferably, the scrim will be located such that it is in close proximity to the surface being cleaned. Thus, the scrim may be incorporated as part of the scrubbing layer or the absorbent layer; or it may be included as a distinct layer, preferably positioned between the scrubbing and absorbent layers. In one preferred embodiment, where the scrim material is of the same x-y dimension as the overall cleaning pad, it is preferred that the scrim material be incorporated such that it does not directly contact, to a significant degree, the surface being cleaned. This will maintain the ability of the pad to move readily across the hard surface and will aid in preventing non-uniform removal of the cleaning solution employed. As such, if the scrim is part of the scrubbing layer, it will be an upper layer of this component. Of course, the scrim must at the same time be positioned sufficiently low in the pad to provide it's scrubbing function. Thus, if the scrim is incorporated as part of the absorbent layer, it will be a lower layer thereof. In a separate embodiment, it may be desirable to place the scrim such that it will be in direct contact with the surface to be cleaned.

In addition to the importance of properly positioning the scrim is that the scrim not significantly impede fluid flow through the pad. The scrim therefore is a relatively open web.

The scrim material will be any material that can be processed to provide a tough, open-textured web. Such materials include polyolefins (e.g., polyethylene, polypropylene), polyesters, polyamides, and the like. The skilled artisan will recognize that these different materials exhibit a different degree of hardness. Thus, the hardness of the scrim material can be controlled, depending on the end-use of the pad/implement. Where the scrim is incorporated as a discrete layer, many commercial sources of such materials are available (e.g., design number VO1230, available from Conwed Plastics, Minneapolis, Minn.). Alternatively, the scrim may be incorporated by printing a resin or other synthetic material (e.g. latex) onto a substrate, such as is disclosed in U.S. Pat. No. 4,745,021, issued May 17, 1988 to Ping, III et al., and U.S. Pat. No. 4,733,774, issued Mar. 29, 1988 to Ping, III et al., both of which are incorporated by reference herein.

The various layers that comprise the cleaning pad may be bonded together utilizing any means that provides the pad with sufficient integrity during the cleaning process. The scrubbing and attachment layers may be bonded to the absorbent layer or to each other by any of a variety of bonding means, including the use of a uniform continuous layer of adhesive, a patterned layer of adhesive or any array of separate lines, spirals or spots of adhesive. Alternatively, the bonding means may comprise heat bonds, pressure bonds, ultrasonic bonds, dynamic mechanical bonds or any other suitable bonding means or combinations of these bonding means as are known in the art. Bonding may be around the perimeter of the cleaning pad (e.g., heat sealing the scrubbing layer and optional attachment layer and/or scrim material), and/or across the area (i.e., the x-y plane) of the cleaning pad so as to form a pattern on the surface of the cleaning pad. Bonding the layers of the cleaning pad with ultrasonic bonds across the area of the pad will provide integrity to avoid shearing of the discrete pad layers during use.

The cleaning pad of the present invention should also be capable of retaining absorbed fluid, even under the pressures exerted during the cleaning process. This is referred to herein as the cleaning pad's ability to avoid "squeeze-out" of absorbed fluid, or conversely its ability to retain absorbed fluid under pressure. The method for measuring squeeze-out is described in the Test Methods section. Briefly, the test measures the ability of a saturated cleaning pad to retain fluid when subjected to a pressure of 0.25 psi. Preferably, the cleaning pads of the present invention will have a squeeze-out value of not more than about 40%, more preferably not more than about 25%, still more preferably not more than about 15%, and most preferably not more than about 10%.

The cleaning implement of the present invention is preferably used in combination with a cleaning solution. The cleaning solution may consist of any known hard surface cleaning composition. Hard surface cleaning compositions are typically aqueous-based solutions comprising one or more of surfactants, solvents, builders, chelants, polymers, suds suppressers, enzymes, etc. Suitable surfactants include anionic, nonionic, zwitterionic, amphoteric and cationic surfactants. Examples of anionic surfactants include, but are not limited to, linear alkyl benzene sulfonates, alkyl sulfates, alkyl sulfonates, and the like. Examples of nonionic surfactants include alkylethoxylates, alkylphenolethoxylates, alkylpolyglucosides, alkylglucamines, sorbitan esters, and the like. Examples of zwitterionic surfactants include betaines and sulfobetaines. Examples of amphoteric surfactants include materials derived using imidazole chemistry, such as alkylampho glycinates, and alkyl imino propionate. Examples of cationic surfactants include alkyl mono-, di-, and tri-ammonium surfactants. All of the above materials are available commercially, and are described in McCutcheon's Vol. 1: Emulsifiers and Detergents, North American Ed., McCutheon Division, MC Publishing Co., 1995.

Suitable solvents include short chain (e.g., $C_1$–$C_6$) derivatives of oxyethylene glycol and oxypropylene glycol, such as mono- and di-ethylene glycol n-hexyl ether, mono-, di- and tri-propylene glycol n-butyl ether, and the like. Suitable builders include those derived from phosphorous sources, such orthophosphate and pyrophosphate, and non-phosphorous sources, such as nitrilotriacetic acid, S,S-ethylene diamine disuccinic acid, and the like. Suitable chelants include ethylene diamine tetra acetic acid and citric acid, and the like. Suitable polymers include those that are anionic, cationic, zwitterionic, and nonionic. Suitable suds suppressers include silicone polymers and linear or branched $C_{10}$–$C_{18}$ fatty acids or alcohols. Suitable enzymes include lipases, proteases, amylases and other enzymes known to be useful for catalysis of soil degradation.

A suitable cleaning solution for use with the present implement comprises from about 0.1% to about 2.0% of a linear alcohol ethoxylate surfactant (e.g., Neodol 1–5®, available from Shell Chemical Co.); from 0 to about 2.0% of an alkylsulfonate (e.g., Bioterge PAS-8s, a linear $C_8$ sulfonate available from Stepan Co.); from 0 to about 1.0% of an alcohol amine (e.g., 2-amino-2-methyl-1-propanol, available from Aldrich Chemical Co.); from 0 to about 0.1% potassium hydroxide; from 0 to about 0.1% potassium carbonate or bicarbonate; optional adjuvents such dyes and/or perfumes; and from about 99.9% to about 90% deionized or softened water. Suitable cleaning solutions useful with the present cleaning implement are described in detail in copending U.S. patent application Ser. No. 60/041, 273 filed Mar. 20, 1997 by R. Master et al.

Figure 3:
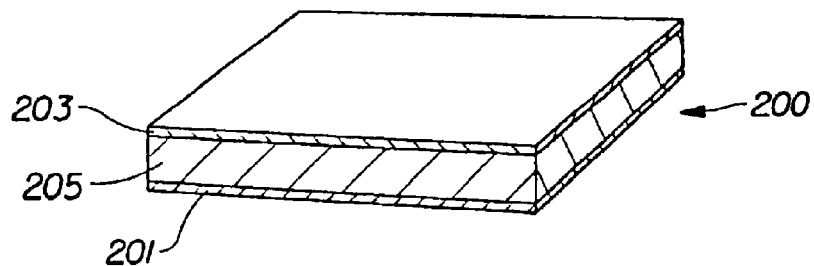
FIG. 3 is a perspective view of a cleaning pad of the present invention.

Referring to the figures which depict the cleaning pad of the present invention, FIG. 3 is a perspective view of a removable cleaning pad 200 comprising a scrubbing layer 201, an attachment layer 203 and an absorbent layer 205 positioned between the scrubbing layer and the attachment layer. For simplicity, cleaning pad 200 is not depicted as having multiple widths in the z-dimension. As indicated above, while FIG. 3 depicts each of layers 201, 203 and 205 as a single layer of material, one or more of these layers may consist of a laminate of two or more plies. For example, in a preferred embodiment, scrubbing layer 201 is a two-ply laminate of carded polypropylene, where the lower layer is slitted. Also, although not depicted in FIG. 3, materials that do not inhibit fluid flow may be positioned between scrubbing layer 201 and absorbent layer 205 and/or between absorbent layer 205 and attachment layers 203. However, it is important that the scrubbing and absorbent layers be in substantial fluid communication, to provide the requisite absorbency of the cleaning pad. While FIG. 3 depicts pad 200 as having all of the pad's layers of equal size in the x and y dimensions, it is preferred that the scrubbing layer 201 and attachment layer 203 be larger than the absorbent layer, such that layers 201 and 203 can be bonded together around the periphery of the pad to provide integrity. The scrubbing and attachment layers may be bonded to the absorbent layer or to each other by any of a variety of bonding means, including the use of a uniform continuous layer of adhesive, a patterned layer of adhesive or any array of separate lines, spirals or spots of adhesive. Alternatively, the bonding means may comprise heat bonds, pressure bonds, ultrasonic bonds, dynamic mechanical bonds or any other suitable bonding means or combinations of these bonding means as are known in the art. Bonding may be around the perimeter of the cleaning pad, and/or across the surface of the cleaning pad so as to form a pattern on the surface of the scrubbing layer 201.

Figure 4:
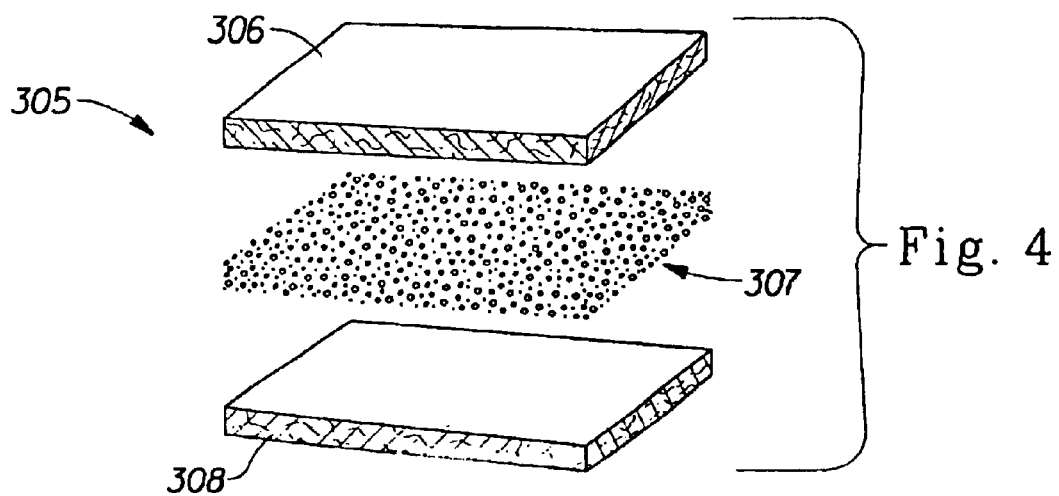
FIG. 4 is a blown perspective view of the absorbent layer of a cleaning pad of the present invention.

FIG. 4 is a blown perspective view of the absorbent layer 305 of an embodiment of a cleaning pad of the present invention. The cleaning pad's scrubbing layer and optional attachment layer are not shown in FIG. 4. Absorbent layer 305 is depicted in this embodiment as consisting of a tri-laminate structure. Specifically absorbent layer 305 is shown to consist of a discrete layer of particulate superabsorbent gelling material, shown as 307, positioned between two discrete layers 306 and 308 of fibrous material. In this embodiment, because of the region 307 of high concentration of superabsorbent gelling material, it is preferred that the superabsorbent material not exhibit gel blocking discussed above. In a particularly preferred embodiment, fibrous layers 306 and 308 will each be a thermally bonded fibrous substrate of cellulosic fibers, and lower fibrous layer 308 will be in direct fluid communication with the scrubbing layer (not shown). (Layer 307 may alternatively be a mixture of fibrous material and superabsorbent material, where the superabsorbent material is preferably present in a relatively high percentage by weight of the layer.) Also, while depicted as having equal widths, in a preferred embodiment layer 306 will be wider than layer 307 and layer 307 will be wider than layer 308. When a scrubbing and attachment layer are included, such a combination will provide a pad having multiple widths in the z-dimension.

Figure 5A:
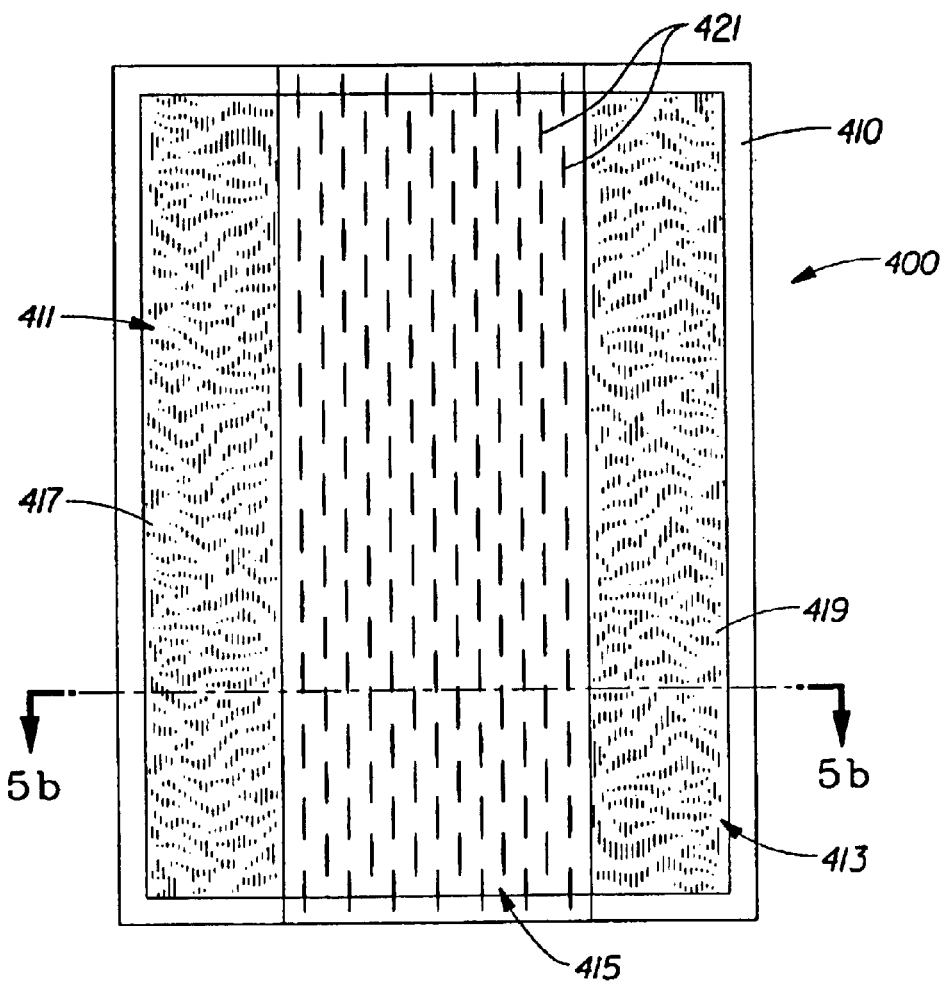
FIG. 5a is a plan view of a cleaning pad of the present invention.
Figure 5B:
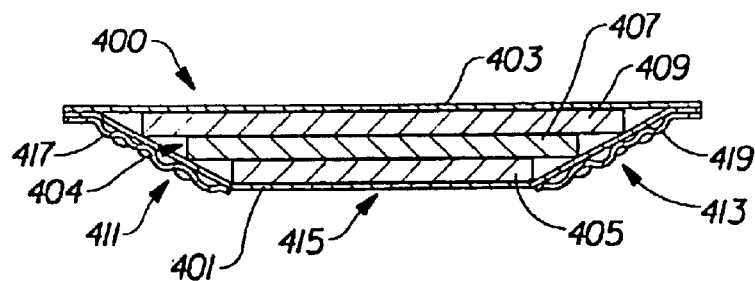

FIG. 5a is a plan view of a preferred cleaning pad 400, with the scrubbing layer facing the viewer. FIG. 5b is a cross-sectional view (taken along the y-z plane) of cleaning pad 400. Referring to FIGS. 5a and 5b, cleaning pad 400 has three surfaces 411, 413 and 415 that result from reducing the absorbent layer's width.

Referring specifically to FIG. 5b, cleaning pad 400 has a scrubbing layer 401, an attachment layer 403, and an absorbent layer indicated generally as 404 positioned between the scrubbing and attachment layers. Absorbent layer 404 consists of three discrete layers 405, 407 and 409. Layer 409 is wider than layer 407 which is wider than layer 405. This decreasing width results in surfaces 411, 413 and 415, while the discontinuity of widths of the discrete absorbent layer materials provides multiple edges. (For purposes of illustration, surface 411 is referred to as the front edge of the cleaning pad 400 when the pad is attached to an implement; surface 413 is referred to as the back edge of pad 400.) The scrubbing layer corresponding to surface 411 comprises, in addition to the material shown as 401, a material 417 that provides significant texture to that surface. In a preferred embodiment this material comprises a scrim material sandwiched between two layers of spunbonded materials. The scrubbing layer corresponding to surface 413 comprises, again in addition to the material shown as 401, a similar material. In contrast, the scrubbing layer corresponding to surface 415 does not contain this textured material; it consists only of layer 401.

FIG. 5a illustrates the general textured pattern provided by materials 417 and 419. Also depicted in FIG. 5a are slits 421 that are preferably incorporated in scrubbing layer 401. Where scrubbing layer 401 actually comprises a laminate of two or more individual materials, slits 421 may be included in one or more of the layers. These slits facilitate entrapment by pad 400 of particulate matter. Slits 421 are also preferably included in materials 417 and 419, as well as the portions of scrubbing layer 401 that correspond to pad surfaces 411 and 413. Also depicted in FIG. 5a is region 410 corresponding to the periphery of pad 400 where scrubbing layer 401 and attachment layer 403 are bonded by any acceptable method. In a preferred embodiment, bonding is accomplished by heat sealing.

In a preferred embodiment, layers 405 and 407 of absorbent layer 404 comprise a high concentration of superabsorbent material, while layer 409 contains little or no superabsorbent material. In such embodiments, one or both of layers 405 and 407 may comprise a homogenous blend of superabsorbent material and fibrous material. Alternatively, one or both layers may be comprised of discrete layers, e.g., two fibrous layers surrounding an essentially continuous layer of superabsorbent particles.

Although not a requirement, Applicants have found that where superabsorbent particles are incorporated in the pad, it may be desirable to reduce the level of or eliminate superabsorbent particles at the extreme front and rear edges of the pad. This accomplished in pad 400 by constructing absorbent layer 409 without superabsorbent material.

V. Test Methods

A. Performance Under Pressure

This test determines the grarnigram absorption of deionized water for a cleaning pad that is laterally confined in a piston/cylinder assembly under an initial confining pressure of 0.09 psi (about 0.6 kPa). (Depending on the composition of the cleaning pad sample, the confining pressure may decrease slightly as the sample absorbs water and swells during the time of the test.) The objective of the test is to assess the ability of a cleaning pad to absorb fluid, over a practical period of time, when the pad is exposed to usage conditions (horizontal wicking and pressures).

The test fluid for the PUP capacity test is deionized water. This fluid is absorbed by the cleaning pad under demand absorption conditions at near-zero hydrostatic pressure.

Figure 6:
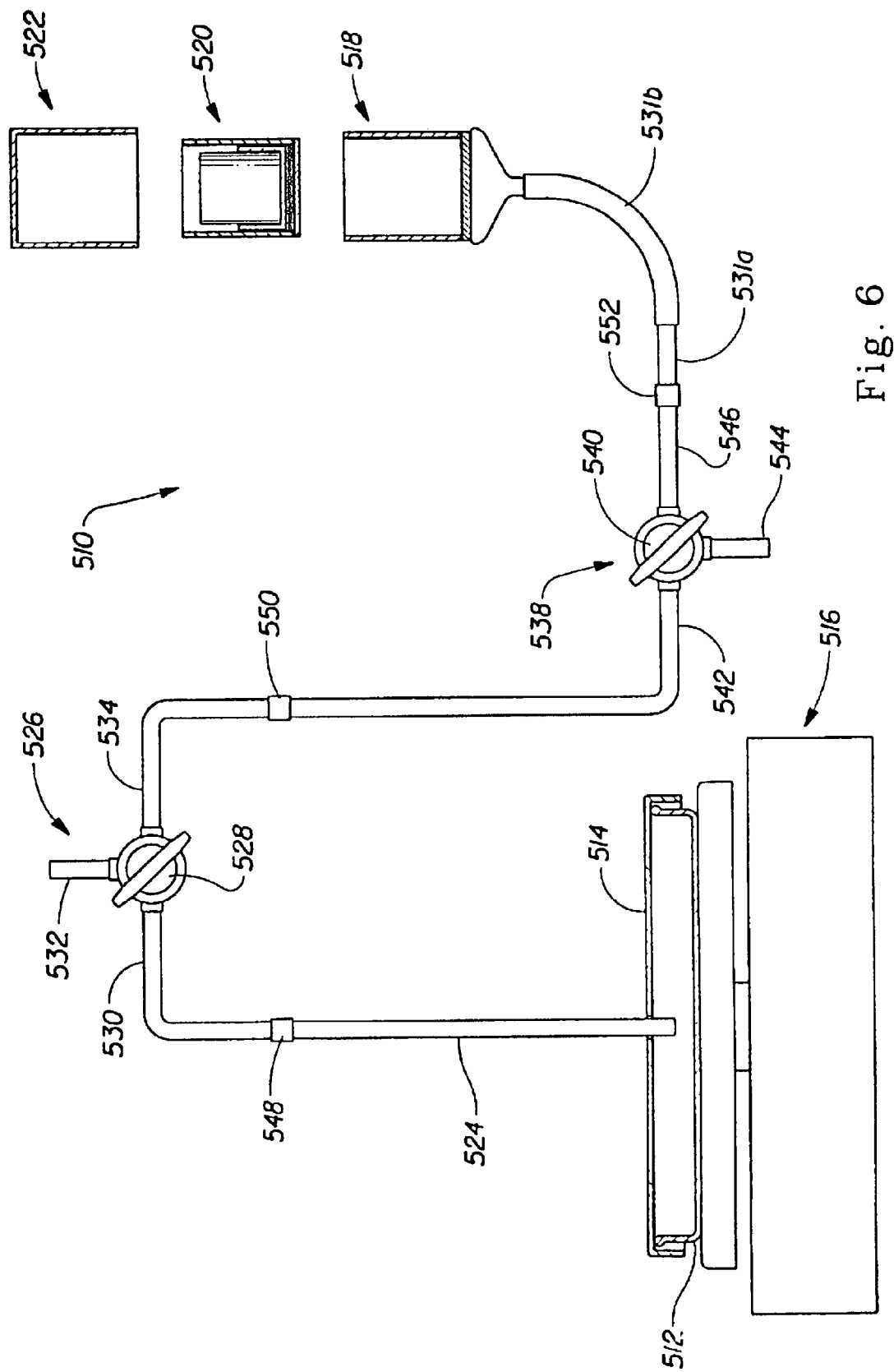
FIG. 6 represents a schematic view of an apparatus for measuring the Performance Under Pressure (PUP) capacity of a cleaning pad.

A suitable apparatus 510 for this test is shown in FIG. 6. At one end of this apparatus is a fluid reservoir 512 (such as a petri dish) having a cover 514. Reservoir 512 rests on an analytical balance indicated generally as 516. The other end of apparatus 510 is a fritted funnel indicated generally as 518, a piston/cylinder assembly indicated generally as 520 that fits inside funnel 518, and cylindrical plastic fritted funnel cover indicated generally as 522 that fits over funnel 518 and is open at the bottom and closed at the top, the top having a pinhole. Apparatus 510 has a system for conveying fluid in either direction that consists of sections glass capillary tubing indicated as 524 and 531a, flexible plastic tubing (e.g., ¼ inch i.d. and ⅜ inch o.d. Tygon tubing) indicated as 531b, stopcock assemblies 526 and 538 and Teflon connectors 548, 550 and 552 to connect glass tubing 524 and 531a and stopcock assemblies 526 and 538. Stopcock assembly 526 consists of a 3-way valve 528, glass capillary tubing 530 and 534 in the main fluid system, and a section of glass capillary tubing 532 for replenishing reservoir 512 and forward flushing the fritted disc in fritted funnel 518. Stopcock assembly 538 similarly consists of a 3-way valve 540, glass capillary tubing 542 and 546 in the main fluid line, and a section of glass capillary tubing 544 that acts as a drain for the system.

Figure 7:
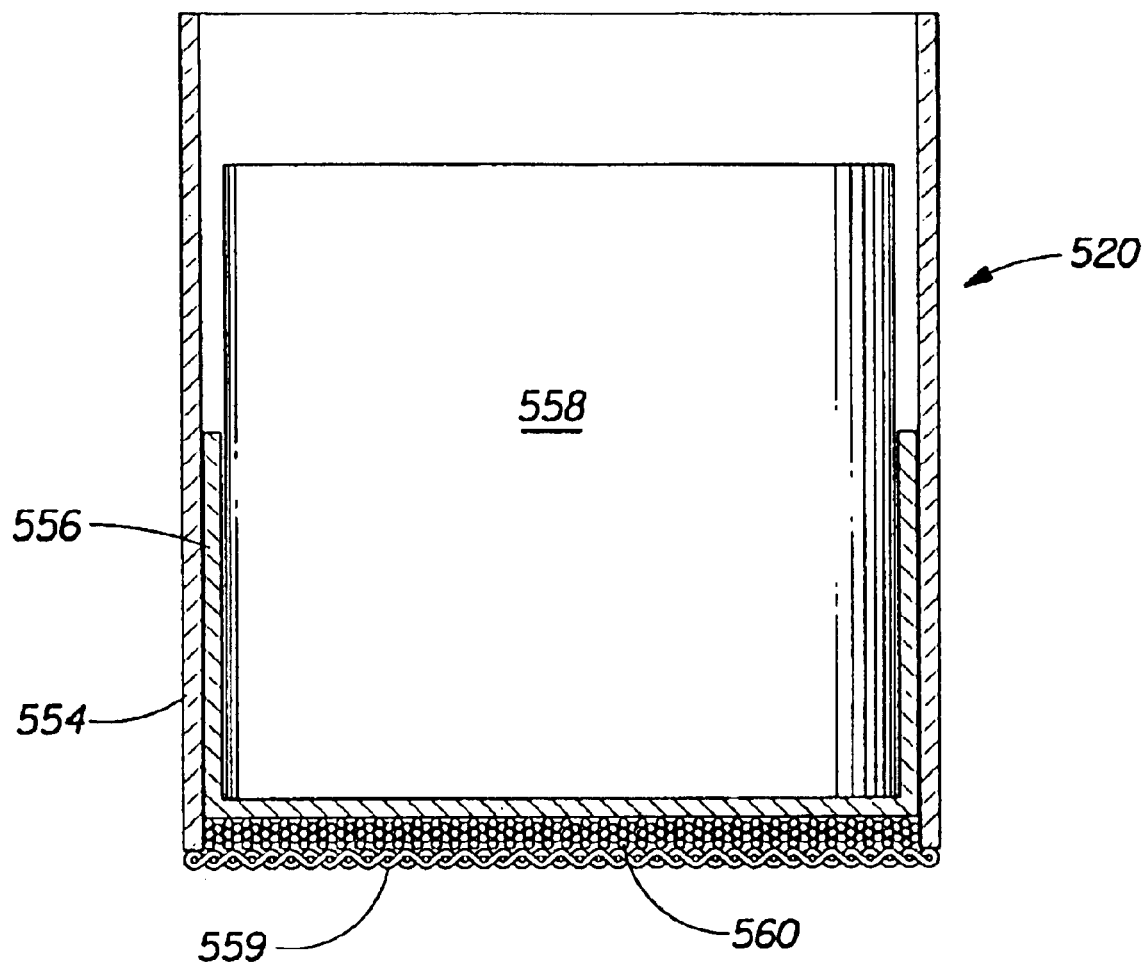
FIG. 7 represents an enlarged sectional view of the piston/cylinder assembly shown in FIG. 6.

Referring to FIG. 7, assembly 520 consists of a cylinder 554, a cup-like piston indicated by 556 and a weight 558 that fits inside piston 556. Attached to bottom end of cylinder 554 is a No. 400 mesh stainless steel cloth screen 559 that is biaxially stretched to tautness prior to attachment. The cleaning pad sample indicated generally as 560 rests on screen 559 with the surface-contacting (or scrubbing) layer in contact with screen 559. The cleaning pad sample is a circular sample having a diameter of 5.4 cm. While sample 560 is depicted as a single layer, the sample will actually consist of a circular sample having all layers contained by the pad from which the sample is cut. Furthermore, it is understood that a pad from which a circular sample taken anywhere within the pad, having the absorbent capacity defined herein, is within the scope of the present invention. That is, where a cleaning pad has regions comprised of different materials through the thickness of the pad, samples should be taken from each of those regions and the absorbent capacity should be measured for each sample. If any of the samples has the absorbent capacity values described above, the pad is deemed to have this absorbent capacity and therefore is within the scope of the present invention.

Cylinder 554 is bored from a transparent LEXAN® rod (or equivalent) and has an inner diameter of 6.00 cm (area=28.25 cm$^2$), with a wall thickness of approximately 5 mm and a height of approximately 5 cm. The piston 556 is in the form of a Teflon cup and is machined to fit into cylinder 554 within tight tolerances. Cylindrical stainless steel weight 558 is machined to fit snugly within piston 556 and is fitted with a handle on the top (not shown) for ease in removing. The combined weight of piston 556 and weight 558 is 145.3 g, which corresponds to a pressure of 0.09 psi for an area of 22.9 cm$^2$.

The components of apparatus 510 are sized such that the flow rate of deionized water therethrough, under a 10 cm hydrostatic head, is at least 0.01 g/cm²/sec, where the flow rate is normalized by the area of fritted funnel 518. Factors particularly impactful on flow rate are the permeability of the fritted disc in fritted funnel 518 and the inner diameters of glass tubing 524, 530, 534, 542, 546 and 531a, and stopcock valves 528 and 540.

Reservoir 512 is positioned on an analytical balance 516 that is accurate to at least 0.01 g with a drift of less than 0.1 g/hr. The balance is preferably interfaced to a computer with software that can (i) monitor balance weight change at pre-set time intervals from the initiation of the PUP test and (ii) be set to auto initiate on a weight change of 0.01–0.05 g, depending on balance sensitivity. Capillary tubing 524 entering the reservoir 512 should not contact either the bottom thereof or cover 514. The volume of fluid (not shown) in reservoir 512 should be sufficient such that air is not drawn into capillary tubing 524 during the measurement. The fluid level in reservoir 512, at the initiation of the measurement, should be approximately 2 mm below the top surface of fritted disc in fritted funnel 518. This can be confirmed by placing a small drop of fluid on the fritted disc and gravimetrically monitoring its slow flow back into reservoir 512. This level should not change significantly when piston/cylinder assembly 520 is positioned within funnel 518. The reservoir should have a sufficiently large diameter (e.g., ~14 cm) so that withdrawal of ~40 ml portions results in a change in the fluid height of less than 3 mm.

Prior to measurement, the assembly is filled with deionized water. The fritted disc in fritted funnel 518 is forward flushed so that it is filled with fresh deionized water. To the extent possible, air bubbles are removed from the bottom surface of the fritted disc and the system that connects the funnel to the reservoir. The following procedures are carried out by sequential operation of the 3-way stopcocks:

1. Excess fluid on the upper surface of the fritted disc is removed (e.g. poured) from fritted funnel 518.
2. The solution height/weight of reservoir 512 is adjusted to the proper level/value.
3. Fritted funnel 518 is positioned at the correct height relative to reservoir 512.
4. Fritted funnel 518 is then covered with fritted funnel cover 522.
5. The reservoir 512 and fritted funnel 518 are equilibrated with valves 528 and 540 of stopcock assemblies 526 and 538 in the open connecting position.
6. Valves 528 and 540 are then closed.
7. Valve 540 is then turned so that the funnel is open to the drain tube 544.
8. The system is allowed to equilibrated in this position for 5 minutes.
9. Valve 540 is then returned to its closed position.

Steps Nos. 7–9 temporarily "dry" the surface of fritted funnel 518 by exposing it to a small hydrostatic suction of ~5 cm. This suction is applied if the open end of tube 544 extends ~5 cm below the level of the fritted disc in fritted funnel 518 and is filled with deionized water. Typically ~0.04 g of fluid is drained from the system during this procedure. This procedure prevents premature absorption of deionized water when piston/cylinder assembly 520 is positioned within fritted funnel 518. The quantity of fluid that drains from the fritted funnel in this procedure (referred to as the fritted funnel correction weight, or "Wffc")) is measured by conducting the PUP test (see below) for a time period of 20 minutes without piston/cylinder assembly 520. Essentially all of the fluid drained from the fritted funnel by this procedure is very quickly reabsorbed by the funnel when the test is initiated. Thus, it is necessary to subtract this correction weight from weights of fluid removed from the reservoir during the PUP test (see below).

A round die-cut sample 560 is placed in cylinder 554. The piston 556 is slid into cylinder 554 and positioned on top of the cleaning pad sample 560. The piston/cylinder assembly 520 is placed on top of the frit portion of funnel 518, the weight 558 is slipped into piston 556, and the top of funnel 518 is then covered with fritted funnel cover 522. After the balance reading is checked for stability, the test is initiated by opening valves 528 and 540 so as to connect funnel 518 and reservoir 512. With auto initiation, data collection commences immediately, as funnel 518 begins to reabsorb fluid.

Data is recorded at intervals over a total time period of 1200 seconds (20 minutes). PUP absorbent capacity is determined as follows:

$$t_{1200} \text{ absorbent capacity (g/g)} = [Wr_{(t=0)} - Wr_{(t=1200)} - Wffc]/Wds$$

where $t_{1200}$ absorbent capacity is the g/g capacity of the pad after 1200 seconds, $Wr_{(t=0)}$ is the weight in grams of reservoir 512 prior to initiation, $Wr_{(t=1200)}$ is the weight in grams of reservoir 512 at 1200 seconds after initiation, Wffc is the fritted funnel correction weight and Wds is the dry weight of the cleaning pad sample.

B. Squeeze-out

The ability of the cleaning pad to retain fluid when exposed to in-use pressures, and therefor to avoid fluid "squeeze-out", is another important parameter to the present invention. "Squeeze-out" is measured on an entire cleaning pad by determining the amount of fluid that can be blotted from the sample with Whatman filler paper under pressures of 0.25 psi (1.5 kPa). Squeeze-out is performed on a sample that has been saturated to capacity with deionized water via horizontal wicking (specifically, via wicking from the surface of the pad consisting of the scrubbing or surface-contacting layer). (One means for obtaining a saturated sample is described as the Horizontal Gravinietric Wicking method of U.S. application Ser. No. 08/542,497 (Dyer et al.), filed Oct. 13, 1995, U.S. Pat. No. 5,849,805 which is incorporated by reference herein.) The fluid-containing sample is placed horizontally in an apparatus capable of supplying the respective pressures, preferably by using an air-filled bag that will provide evenly distributed pressure across the surface of the sample. The squeeze-out value is reported as the weight of test fluid lost per weight of the wet sample.

Again, where a cleaning pad has regions comprised of different materials through the thickness of the pad, samples should be taken from each of those regions and squeeze-out should be measured on all of the samples. If any of the samples has a squeeze-out value described above, the pad is deemed to have this squeeze-out value.

What is claimed is:

1. An implement for cleaning a surface, the implement comprising:
   a. a handle comprising a support head at one end; and
   b. a disposable and removable cleaning pad having an upper surface and a lower surface, wherein the cleaning pad has multiple widths in the z-dimension and wherein the cleaning pad comprises:
      i. a scrubbing layer,
      ii. an absorbent layer in direct fluid communication with the scrubbing layer wherein the absorbent layer comprises a superabsorbent material; and iii. an attachment layer for releasably attaching said cleaning pad to said handle, wherein said attachment layer is essentially fluid impervious.

2. The cleaning implement of claim 1 wherein the support head comprises an upper surface that is attached to the handle and a lower surface that comprises hooks for releasably attaching the cleaning pad to the support head.

3. The cleaning implement of claim 1 wherein the cleaning pad has a squeeze-out value of not more than about 25% under 0.25 psi of pressure.

4. The cleaning implement of claim 1 wherein the absorbent layer comprises at least about 15%, by total weight of the absorbent layer, of the superabsorbent material.

5. The cleaning implement of claim 1 wherein the superabsorbent material is selected from the group consisting of superabsorbent gelling polymers and hydrophilic polymeric absorbent foams.

6. An implement for cleaning a surface, the implement comprising:
  a. a handle comprising a support head having a top surface and a bottom surface, said support head comprising hooks permanently affixed to said bottom surface of said support head; and
  b. a removable cleaning pad having an upper surface and a lower surface, wherein the cleaning pad has multiple widths in the z-dimension, and wherein the cleaning pad comprises:
    i. a scrubbing layer;
    ii. an absorbent layer; and
    iii. an attachment layer comprising a material that is essentially fluid impervious and at least one surface which is mechanically attachable to said hooks affixed to said bottom surface of said support head;

wherein the lower surface of the cleaning pad comprises a substantially flat lower cleaning surface and at least two cleaning surfaces extending from said lower cleaning surface wherein said at least two cleaning surfaces are non-parallel to said substantially flat lower cleaning surface and wherein said substantially flat lower cleaning surface and said at least two cleaning surfaces define at least three discrete cleaning surfaces each of which being adapted to contact the surface being cleaned.

7. The cleaning implement of claim 6 wherein the scrubbing layer is in direct fluid communication with the absorbent layer.

8. The cleaning implement of claim 6 wherein the absorbent layer is positioned between the scrubbing layer and the attachment layer.

9. The cleaning implement of claim 8 wherein the scrubbing layer is in direct fluid communication with the absorbent layer.

10. A cleaning pad having an upper surface and a lower surfacess, a bottom layer, an absorbent layer in direct fluid communication with said bottom layer and an upper layer positioned above said absorbent layer wherein the cleaning pad has multiple widths in the z-dimension, and wherein said absorbent layer comprises a superabsorbent material such that said absorbent layer has a $t_{1200}$ absorbent capacity of at least about 15 g/g.

11. The cleaning pad of claim 10 wherein said bottom layer is a scrubbing layer wherein the width of said scrubbing layer is greater than the width of said absorbent layer such that said scrubbing layer is removably attachable to a cleaning implement.

12. The cleaning pad of claim 11 wherein the absorbent layer comprises at least about 15%, by weight of the absorbent layer, of the superabsorbent material.

13. The cleaning pad of claim 10 wherein said upper layer is an attachment layer for mechanically attaching the cleaning pad to a handle of a cleaning implement, and wherein the absorbent layer is positioned between said bottom layer and said attachment layer.

14. The cleaning pad of claim 10 wherein the superabsorbent material is selected from the group consisting of superabsorbent gelling polymers and hydrophilic polymeric absorbent foams.

15. The cleaning pad of claim 10 wherein the lower surface of the cleaning pad comprises two or more discrete surfaces each of which contact the surface being cleaned.

16. A cleaning pad comprising:

a scrubbing layer;

an absorbent layer in direct fluid communication with said scrubbing layer; and an upper layer positioned above said absorbent layer, wherein the width of said scrubbing layer is greater than the width of said absorbent layer such that said cleaning pad has multiple widths in the z-dimension and said scrubbing layer is removably attachable to a cleaning implement, and wherein said cleaning pad has a $t_{1200}$ absorbent capacity of at least about 5 g/g.

17. The cleaning pad of claim 16 wherein said upper layer is fluid impervious.

18. The cleaning pad of claim 16 wherein said cleaning pad has a $t_{1200}$ absorbent capacity of at least about 10 g/g.

19. The cleaning pad of claim 18 wherein said cleaning pad has a $t_{1200}$ absorbent capacity of at least about 15 g/g.

20. The cleaning pad of claim 19 wherein said cleaning pad has a $t_{1200}$ absorbent capacity of at least about 20 g/g.

* * * * *